(12) United States Patent
Ma et al.

(10) Patent No.: US 9,432,250 B2
(45) Date of Patent: Aug. 30, 2016

(54) REDUNDANT NETWORK IMPLEMENTATION METHOD

(75) Inventors: Huayi Ma, Beijing (CN); Baihua Xue, Beijing (CN); Qiyun Jiang, Beijing (CN); Yingjun He, Beijing (CN); Fanmin Chen, Beijing (CN); Jianchao Huang, Beijing (CN); Jianfeng Zhang, Beijing (CN); Shuchang Zhao, Beijing (CN)

(73) Assignee: Kyland Technology Co., Ltd, Beijing (CN)

( * ) Notice: Subject to any disclaimer, the term of this patent is extended or adjusted under 35 U.S.C. 154(b) by 107 days.

(21) Appl. No.: 14/370,898

(22) PCT Filed: Feb. 29, 2012

(86) PCT No.: PCT/CN2012/071787
§ 371 (c)(1),
(2), (4) Date: Jul. 7, 2014

(87) PCT Pub. No.: WO2013/127075
PCT Pub. Date: Sep. 6, 2013

(65) Prior Publication Data
US 2015/0138950 A1   May 21, 2015

(30) Foreign Application Priority Data
Feb. 27, 2012   (CN) .......................... 2012 1 0047122

(51) Int. Cl.
*H04L 12/24* (2006.01)
*H04L 1/22* (2006.01)
*H04L 12/42* (2006.01)
*H04L 12/427* (2006.01)
*H04L 1/00* (2006.01)

(52) U.S. Cl.
CPC ......... *H04L 41/0654* (2013.01); *H04L 1/0061* (2013.01); *H04L 1/22* (2013.01); *H04L 12/42* (2013.01); *H04L 12/427* (2013.01)

(58) Field of Classification Search
CPC ....... H04L 1/22; H04L 1/0061; H04L 12/42; H04L 12/427; H04L 12/462; H04L 41/0654; H04L 11/08; H04L 11/20; H04L 2012/421; H04L 12/422–12/437; H04L 45/02; H04L 29/08441; H04L 29/08648; H04L 67/16; H04L 61/30; H04L 12/2484; H04L 12/2416; H04L 19/08396; H04L 69/40; H04L 45/22–45/28
See application file for complete search history.

(56) References Cited

U.S. PATENT DOCUMENTS

2001/0019540 A1* 9/2001 Uematsu ................. H04L 12/43
370/258
2005/0243823 A1* 11/2005 Griswold .............. H04L 12/437
370/389

(Continued)

FOREIGN PATENT DOCUMENTS

| CN | 101079781 A | 11/2007 |
|---|---|---|
| CN | 102014001 A | 4/2011 |
| CN | 101252426 B | 5/2011 |

*Primary Examiner* — Charles C Jiang
*Assistant Examiner* — Rose Clark
(74) *Attorney, Agent, or Firm* — The Webb Law Firm

(57) ABSTRACT

Disclosed is a method of implementing a redundant network. Ring network nodes in an initial state are set as master stations, ring ports are set in a half-blocked state, a master station election notification message is broadcast to the ring ports within a preset time interval, the nodes receive the master station election notification message, a node quality comparison vector is compared with node quality comparison vectors of the nodes to elect a master and standby stations, one of the ring ports is in the half-blocked state, the other ring ports are in a forwarding state, the master station broadcasts the master station election notification message to the ring ports, the standby master station stops sending the master station election notification message, the ring ports are in the forwarding state, and the message sent by the master station is received.

10 Claims, 5 Drawing Sheets

(56) References Cited

U.S. PATENT DOCUMENTS

2007/0253330 A1\* 11/2007 Tochio .................. H04L 12/423
370/222

2008/0025203 A1\* 1/2008 Tallet ...................... H04L 45/02
370/216

2009/0268610 A1\* 10/2009 Wu ......................... H04L 12/42
370/222

\* cited by examiner

REDUNDANT NETWORK IMPLEMENTATION METHOD

CROSS-REFERENCE TO RELATED APPLICATIONS

This application is the U.S. national phase of International Application No. PCT/CN2012/071787 filed Feb. 29, 2012, and claims priority to Chinese Patent Application No. 201210047122.7 filed Feb. 27, 2012, the disclosures of which are hereby incorporated in their entirety by reference.

FIELD OF THE INVENTION

The present invention relates to the technical field of ring network, and in particular to a redundant network implementation method.

BACKGROUND OF THE INVENTION

In order to overcome redundancy on a network transmission path, a rapid spanning tree protocol (RSTP, see IEEE802.1w) and a multiple spanning tree protocol (MSTP, see IEEE802.1w) are adopted in the current high-availability network. These two protocols are applicable to a ring network to achieve path redundancy through certain algorithms, and to prune the ring network into a loop-free tree network at the same time.

Although link failures may be detected by the two protocols, messages are frequently sent during operation to check the network state. It could regularly cause a relatively long time for failure recovery. As a result, the two protocols could not meet requirements of industrial networks in terms of real-time property.

To meet the requirements of network protocols on the real-time property of industrial networks, International Electrotechnical Commission (IEC) has established an industrial automation high-availability network protocol set-IEC 62439 protocols, wherein IEC 62439-2 MRP (Media Redundancy Protocol) utilizes a master-slave network structure; however, only one definite master node exists in the network and only the master equipment is used for dealing with the failure once it occurs. There is a problem in the network risk concentration. In addition, a redundancy protection on the kernel terminal equipment is not achieved. Moreover, the EC 62439-3 PRP (Parallel Redundancy Protocol) uses two equivalently backbone networks, and a fast failure recovery for terminal equipment is realized using a dual-port redundancy technology, but there is a drawback of detecting well states of the dual ports and it results an increase in the system cost.

To this end, the applicant proposes IEC62439-6 distribution redundancy ring network protocol-DRP (Distribution Redundancy Protocol), reference should be made to Chinese patent CN101252426B for the details of the technology, and the distribution redundancy loop protocol employs a network structure in which master stations take turns. However, since the master stations take turns periodically, such requirements as complex loop operation and high hardware requirement should be met.

SUMMARY OF THE INVENTION

Given that such requirements as complex loop operation and high hardware requirement need to be met due to the periodic turning mode of the master stations in the prior art, it is an object of the present invention to provide a redundant network implementing method, which can elect a master station according to the node quality so as to reduce loop operation complexity and hardware requirements.

To achieve the object of the present invention, adopted is the technical solution below.

The present invention provides a redundant network implementing method; the redundant network includes at least one ring network which includes at least two nodes, the nodes are connected with ring ports there between through a link, and the implementing method includes the following steps in a single ring network:

A. setting all nodes in the single ring network in an initial state as master stations, setting a ring port of each node in a half-blocked state, and broadcasting, with all nodes a master station election notification message to the ring ports within a preset time interval;

B. the master station election notification message comprising a node quality comparison vector;

C. receiving, with the other nodes in the single ring network, the master station election notification message; and each of the other nodes comparing the node quality comparison vector included in the received master station election notification message with the node quality comparison vector owned in each of the other nodes, so as to elect a master station and a standby master station, wherein one of the ring ports of the master station is set in the half-blocked state, the other ring ports of the master station are set in a forwarding state, and the master station periodically broadcasts the master station election notification message to the ring ports within the preset time interval;

D. stopping the standby master station from sending the master station election notification message; setting the ring ports of the standby master station in the forwarding state; and receiving the master station election notification message sent from the master station;

E. when the standby master station detects the change of the node quality, the standby master station compares the node quality comparison vector in the received master station election notification message with the node quality comparison vector of the standby master station, so as to reelect a master station, wherein one of the ring ports of the new master station is set in the half-blocked state, the other ring ports of the new master station are set in the forwarding state, and the ring ports set in the half-blocked state in the former master station are set in the forwarding state; and F. when the state of the ring port of the node in the single ring network changes, the node refreshes an address list and broadcasts a topology change notification message to the ring port, and when the other nodes in the single ring network receive the topology change notification message, the other nodes refreshes the address list.

Further, a double ring network is formed when two single ring networks have two jointly-connected nodes and connecting links, wherein the two nodes are shared nodes, one of the single ring networks is a primary ring network, the double ring network is a secondary ring network, the shared nodes can be elected as the master station and the standby master station of the secondary ring network, and the primary ring network and the secondary ring network are divided into different ring network domains according to different IDs appointed by a user; the primary ring network elects the master station and the standby master station according to the steps of the single ring network, the primary ring network manages the state of the ring ports of the primary ring network and is responsible for transferring the protocol message of the secondary ring network, the nodes of the primary ring network, except the shared nodes, do not participate in the election of the master station or the standby master station of the secondary ring network, and the following steps are adopted for the secondary ring network:

G. connecting the shared nodes of the secondary ring network with two ring ports of the primary ring network, said two ring ports of the primary ring network thus being regarded as shared ports of the secondary ring network; and detecting, by the shared nodes, the connection state of the shared nodes through a bidirectional forwarding detection message;

H. when two links between the shared nodes are simultaneously disconnected, the shared nodes sends a secondary ring master station election notification message to the secondary ring network, and one of the shared nodes is elected as the secondary ring network master station; and when one of the two links between the shared nodes is recovered, the shared nodes send a master station election message to the secondary ring network, and the secondary ring network reelecting the master station;

I. receiving, with the nodes of the primary ring network, the topology change notification message of the secondary ring network, and refreshing the address list; and J. receiving, with the nodes of the secondary ring network, the topology change notification message of the primary ring network, and refreshing the address list.

Further, the node quality comparison vector includes a link state identification, a CRC threshold-crossing level, an IP address and an Mac address, wherein the link state identification is defined as a connection state between neighboring nodes, namely, connected or disconnected, and has the priority condition for determining whether electing the node as the master station; the CRC threshold-crossing level is used for judging the CRC statistical threshold-crossing levels of the ring ports within a fixed time interval; and the IP address and the Mac address are used for determining the master station and the standby master station through the IP address and the Mac address when the master station and the standby master station cannot be elected according to the link state identification and the CRC threshold-crossing level.

Further, (1) when the link state identification of the master station election notification message is disconnection and the link state of the ring port of the node receiving the master station election notification message is connection, the node receiving the master station election notification message is elected as the standby master station;

(2) when the link state of the ring port of the node receiving the master station election notification message is disconnection and the link state in the master station election message received by the node receiving the master station election notification message is connection, the node receiving the master station election notification message is set as the master station, and the master station election notification message is periodically sent according to the preset time interval;

(3) when the link state identification of the master station election notification message and the link state of the ring port in the link state identification of the node receiving the master station election notification message are simultaneously connected or disconnected, the CRC threshold-crossing level in the master station election notification message is compared with the CRC threshold-crossing level of the ring port of the node receiving the master station election notification message, and the node receiving the master station election notification message is elected as the standby master station when the CRC threshold-crossing level in the master station election notification message is greater than the CRC threshold-crossing level of the ring port of the local node;

(4) when the link state identification of the master station election notification message and the link state of the ring port in the link state identification of the node receiving the master station election notification message are simultaneously connected or disconnected, the CRC threshold-crossing level in the master station election notification message is compared with the CRC threshold-crossing level of the ring port of the local node, and when the CRC threshold-crossing level in the master station election notification message is lower than the CRC threshold-crossing level of the ring port of the node receiving the master station election notification message, the node receiving the master station election notification message is set as the master station, and the master station election message is periodically sent according to the preset time interval; and (5) when the link state identification of the master station election notification message and the link state of the ring port in the link state identification of the node receiving the master station election notification message are simultaneously connected or disconnected, and when the value of the CRC threshold-crossing level in the master station election notification message is equal to the value of the CRC threshold-crossing level of the ring port of the node receiving the master station election notification message, the IP address and the Mac address in the master station election notification message are compared with the IP address and the Mac address of the node receiving the master station election notification message, the node receiving the master station election notification message is elected as the standby master station when the IP address and the Mac address in the master station election notification message are longer than the IP address and the Mac address of the node receiving the master station election notification message, otherwise, the node receiving the master station election notification message is set as the master station, and the master station election message is periodically sent according to the preset time interval.

Further, the node sends to a neighboring node a link detection message for detecting the link connection and disconnection of the two nodes, so as to detect the link connection or disconnection of the neighboring node.

Further, the redundant network at least further includes one external network, wherein the ring network and the external network are connected through at least two links, the port for connection of the links and the nodes of the ring network is a standby link port, and the implementing method includes the following steps:

K. when the initial state of the standby link port is the blocked state, the nodes periodically broadcasts a standby link election message to the ring ports of the ring network within a preset time interval;

L. receiving, with the other nodes the standby link election message sent by the node, wherein the standby link election message contains a standby link quality comparison vector designed for comparing the standby link qualities;

M. the other nodes comparing the link quality comparison vector included in the standby link election message with the standby link quality comparison vectors owned in each of the other nodes, so as to elect a master standby link and a slave standby link, wherein the standby link port connected with the master standby link is set in the forwarding state, the standby link port connected with the slave standby link is set in the blocked state, and the node connected with the master standby link periodically broadcasts the standby link election message to the ring ports;

N. the ring network node connected with the slave standby link stopping sending the standby link election message, and receiving the standby link election message; and O. when the ring network node connected with the master standby link detects the quality change of the master standby link, the ring network node connected with the slave standby link compares the link quality comparison vector in the standby link election message with the standby link quality comparison vector of the ring network node connected with the slave standby link, so as to elect a master standby link; setting the standby link port of the former master standby link in the blocked state, wherein the standby link port connected with the new master standby link is set in the forwarding state, the address list is refreshed by the ring network node connected with the new master standby link, wherein the ring network node connected with the new master standby link broadcasts the topology change notification message to the ring ports, and when other ring network nodes receive the topology change notification message, the address list is refreshed by the other ring network nodes.

Further, the standby link quality comparison vector includes a standby link state identification, a standby link CRC threshold-crossing level, an IP address and an Mac address, the standby link CRC threshold-crossing level is used for judging the CRC statistical threshold-crossing levels of the standby link ports within a fixed time interval; the standby link state identification is used for identifying the state of the standby link port as connection or disconnection; and the IP address and the Mac address are used for determining the master standby link and the slave standby link by comparing the IP address and the Mac address when the master standby link and the slave standby link cannot be elected according to the standby link state identification and the standby link CRC threshold-crossing level.

Further, (1) when a ring network node with no standby link receives the standby link election message, the standby link election message is dropped;

(2) when the standby link state identification of the node receiving the standby link election message is connection, the external link of the node receiving the standby link election message is elected as the standby link; and when the standby link state of the node receiving the standby link election message is changed from disconnection to connection, the standby link of the node receiving the standby link election message is set as the slave standby link, and the master standby link election message is periodically broadcasted sent to the ring port within the preset time interval;

(3) when the standby link state identification of the standby link election message and the standby link state of the node receiving the standby link election message are both connected, the standby link CRC threshold-crossing level in the standby link quality comparison vector in the standby link election message is compared with the standby link CRC threshold-crossing level of the node receiving the standby link election message, and when the standby link CRC threshold-crossing level in the standby link quality comparison vector in the standby link election message is greater than the standby link CRC threshold-crossing level of the node receiving the standby link election message, the standby link connected with the node is elected as the master standby link, and the master standby link election message is periodically broadcasted sent to the ring port within the preset time interval; and (4) when the standby link state identification of the standby link election message and the standby link state of the node receiving the standby link election message are both connected, and when the standby link CRC threshold-crossing level of the node receiving the standby link election message is equal to the standby link CRC threshold-crossing level in the standby link election message, the IP address and the Mac address of the node receiving the standby link election message are compared with the IP address and the Mac address of the standby link election message, the standby link of the node receiving the standby link election message is elected as the slave standby link when the IP address and the Mac address of the standby link election message are longer than the IP address and the Mac address of the node receiving the standby link election message, otherwise, the standby link of the node receiving the standby link election message is elected as the master standby link.

By adopting the technical solution of the present invention, the master station can be changed at any time according to the node quality, furthermore, link redundancy between networks may also be realized, thereby reducing loop operation complexity and hardware requirements.

Other features and advantages of the present invention will be illustrated in the following description, and will partially become apparent from the description, or understood by implementing the present invention. The object and other advantages of the present invention may be realized and obtained by the structure specified in the written description, claims, and accompanying drawings.

A further detailed description will be made below to the technical solution of the present invention in conjunction with the accompanying drawings and the embodiments.

BRIEF DESCRIPTION OF THE DRAWINGS

The accompanying drawings are provided for a further understanding of the present invention, and constitute a part of the description for the purpose of interpreting the present invention together with the embodiments of the present invention, rather than limiting the present invention. In the accompanying drawings.

DETAILED DESCRIPTION OF THE EMBODIMENTS

The preferred embodiments of the present invention are illustrated below in conjunction with the accompanying drawings, and it can be understood that the preferred embodiments described herein are for illustration and interpretation of the present invention only, not limitation thereto.

Figure 1:
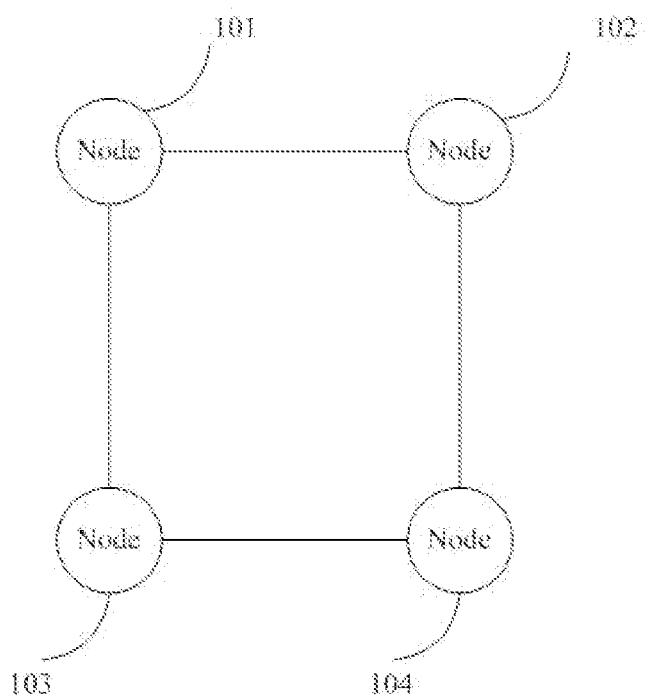
FIG. 1 is a structure diagram of a single ring network in the first embodiment of the present invention.

The redundant network in the technical solution of the present invention includes at least one ring network having at least two nodes. The nodes are connected with ring ports therebetween through links, as shown in FIG. 1. A single ring network includes a node 101, a node 102, a node 103 and a node 104, and the nodes are connected with the ring ports therebetween through links.

In an initial state, the nodes 101, 102, 103, 104 of the single ring network are set as master stations. The ring ports of the nodes are set in a half-blocked state. Also, the MAC address of a data message source in the half-blocked state is not adopted through the nodes, and the data message is blocked simultaneously. However the protocol message of the present invention is forwarded in the loop and a master station election notification message is broadcasted sent to the ring ports within a preset time interval.

For example, when the node 101 in the single ring network sends the master station election notification message after receiving the master station election notification message, the other nodes in the single ring network, the node 102, 103 and 104 compare a node quality comparison vector in the received master station election notification message with the own node quality comparison vector of each node to elect a master station and a standby master station. One of the ports of the node of the master station is assigned to the half-blocked state. Other ports of the node of the master station are assigned to a forwarding state. Moreover, the master station election notification message is periodically broadcasted to the ring ports within the preset time interval using the node which has becomes the master station. For example, the preset time is 5 s and the period time is 1 s.

Figure 2:
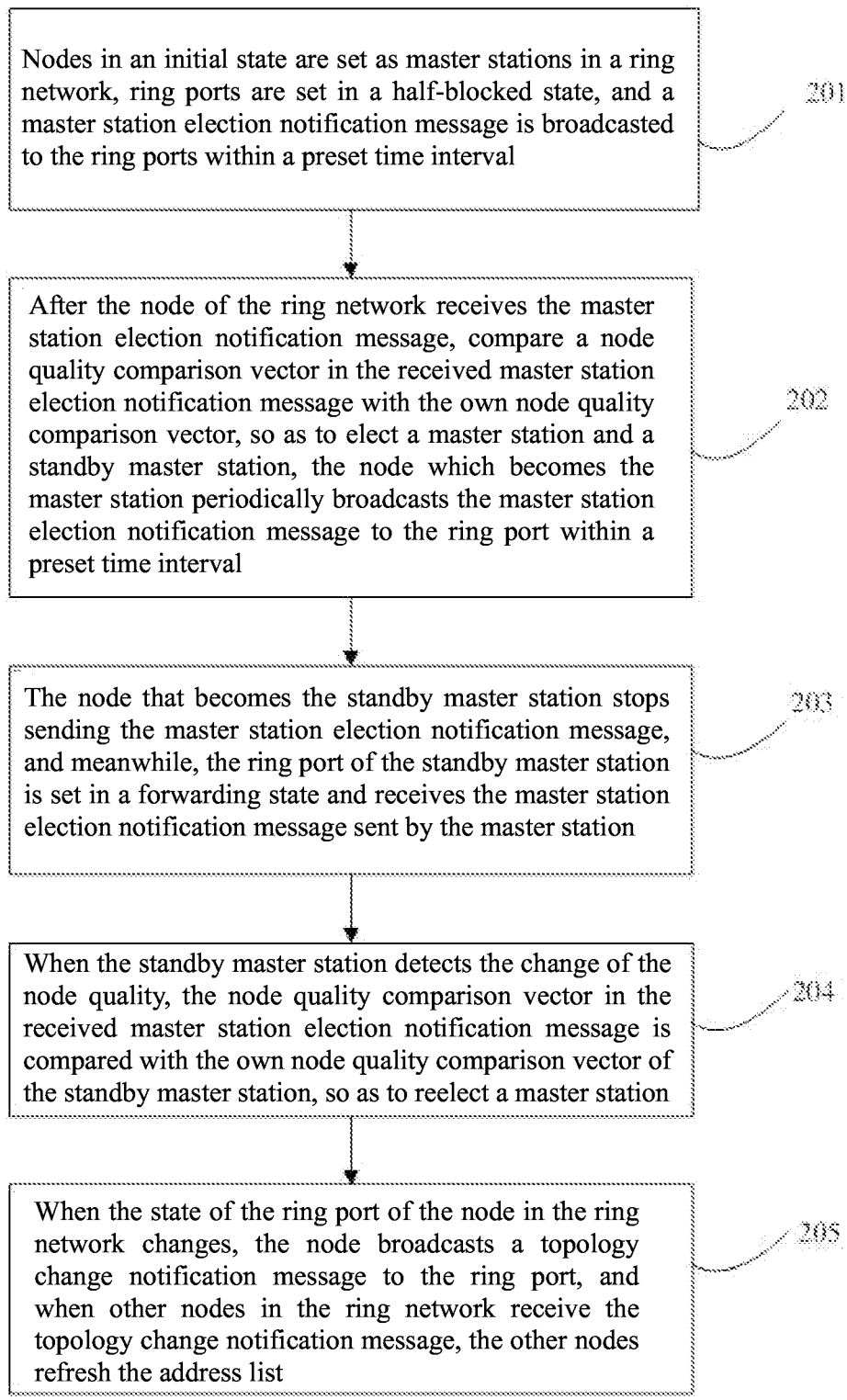
FIG. 2 is a flowchart of implementation of master station redundancy in a single ring network in the second embodiment of the present invention.

FIG. 2 shows a flowchart of implementation of master station redundancy in a single ring network according to a second embodiment of the present invention. As shown in FIG. 2, the flow of implementing master station redundancy in the single ring network includes the following steps:

Step 201, all nodes in the ring network, when in the initial state, are assigned t as master stations. Additionally, the ring port of each node is set in the half-blocked state, and a master station election notification message is broadcasted to the ring ports within a preset time interval. The master station election notification message contains a node quality comparison vector. The node quality comparison vector has a link state identification, a CRC threshold-crossing level, an IP address and a Mac address. The link state identification is defined as a connection state, which is state of connection or disconnection between neighboring nodes. Also it has the priority demonstrating whether the node is elected to be as the master station. The CRC threshold-crossing level is provided to determine the CRC statistical threshold-crossing levels of the ring ports within a fixed time interval. The IP address and the Mac address both are used to determine the master station and the standby master station t when the master station and the standby master station cannot be elected according to the link state identification and the CRC threshold-crossing level.

Step 202, after the other nodes in the ring network receive the master station election notification message, through a comparison between the node quality comparison vector in the received master station election notification message and the node quality comparison vector of each node of the other nodes, a master station and a standby master station are elected. The node elected as the standby master station is of a lower priority level.

After the master station and the standby master station are elected, one of the ports of the node of the master station is set in the half-blocked state. Then, the other ports of the node of the master station are set in the forwarding state. The node which becomes the master station periodically broadcasts the master station election notification message to the ring ports within the preset time interval, and the preset time can be 5 s and the period time can be 1 s.

The specific process of master station election is as followings:

(1) when the link state identification of the master station election notification message is disconnection, and the link state of the ring port of the node receiving the master station election notification message is connection, the node receiving the master station election notification message is elected as the standby master station.

(2) when the link state of the ring port of the node receiving the master station election notification message is disconnection, and the link state in the master station election message received by the node receiving the master station election notification message is connection, the node receiving the master station election notification message is set as the master station, and the node becoming the master station periodically sends the master station election message according to the preset time interval.

(3) when the link state identification of the master station election notification message received by the node in the ring network and the link state of the ring port of the node receiving the master station election notification message are simultaneously connected or disconnected, the CRC threshold-crossing level in the master station election notification message is compared with the CRC threshold-crossing level of the ring port of the node receiving the master station election notification message. The node receiving the master station election notification message is elected as the standby master station when the CRC threshold-crossing level in the master station election notification message is greater than the CRC threshold-crossing level of the ring port of the node receiving the master station election notification message.

(4) when the link state identification of the master station election notification message received by the node in the ring network and the link state of the ring port of the node receiving the master station election notification message are simultaneously connected or disconnected, the CRC threshold-crossing level in the master station election notification message is compared with the CRC threshold-crossing level of the ring port of the local node. When the CRC threshold-crossing level in the master station election notification message is lower than the CRC threshold-crossing level of the ring port of the node receiving the master station election notification message, the node receiving the master station election notification message is assigned to be as the master station, and the node becoming the master station periodically sends the master station election message according to the preset time interval.

(5) when the link state identification of the master station election notification message received by the node in the ring network and the link state of the ring port of the node receiving the master station election notification message are simultaneously connected or disconnected. When the value of the CRC threshold-crossing level in the master station election notification message is equal to the value of the CRC threshold-crossing level of the ring port of the node receiving the master station election notification message, the IP address and the Mac address in the master station election notification message are compared with the IP address and the Mac address of the node receiving the master station election notification message. Furthermore, when the IP address and the Mac address in the master station election notification message are longer than the IP address and the Mac address of the node receiving the master station election notification message, the node receiving the master station election notification message is elected as the standby master station, otherwise, the node receiving the master station election notification message is assigned to be as the master station, and the node which becomes the master station periodically sends the master station election message according to the preset time interval.

Step 203, the node which becomes the standby master station stops sending master station election notification message. Meanwhile, the ring ports of the standby master station are set in the forwarding state, and receive the master station election notification message sent by the master station.

Step 204, when the standby master station detects the change of the node quality of the standby master station, A comparison between the node quality comparison vector in the received master station election notification message and the own node quality comparison vector of the standby master station is implemented using the standby master station, so as to reelect a master station. One of the ports of the node which becomes the new master station is set to be in the half-blocked state. Also, other ports of the node which become the new master station are set to be in the forwarding state, and the ring ports in the half-blocked state in the former master station are assigned to the forwarding state.

Step 205, when the state of the ring port of the node in the ring network changes, the node conducts to refresh an address list and broadcasts a topology change notification message to the ring port. In addition, when other nodes in the ring network receive the topology change notification message, the address list is refreshed by those nodes.

Each node of the ring network sends a link detection message using to detect the node quality to a neighboring node. When detecting the connection or disconnection of the neighboring nodes, the link detection message can be applied to unidirectional detection, including link connection and disconnection as well as connection and disconnection of ports connected with the link. Also, the node determines the connection and disconnection state according to the link detection message sent from the neighboring node.

When the link between the nodes is disconnected, the ring port of the node is assigned as the half-blocked state. Other ring ports of the node connected with the disconnected link are assigned to be as the forwarding state, and the node connected with the disconnected link is elected as the master station.

Figure 3:
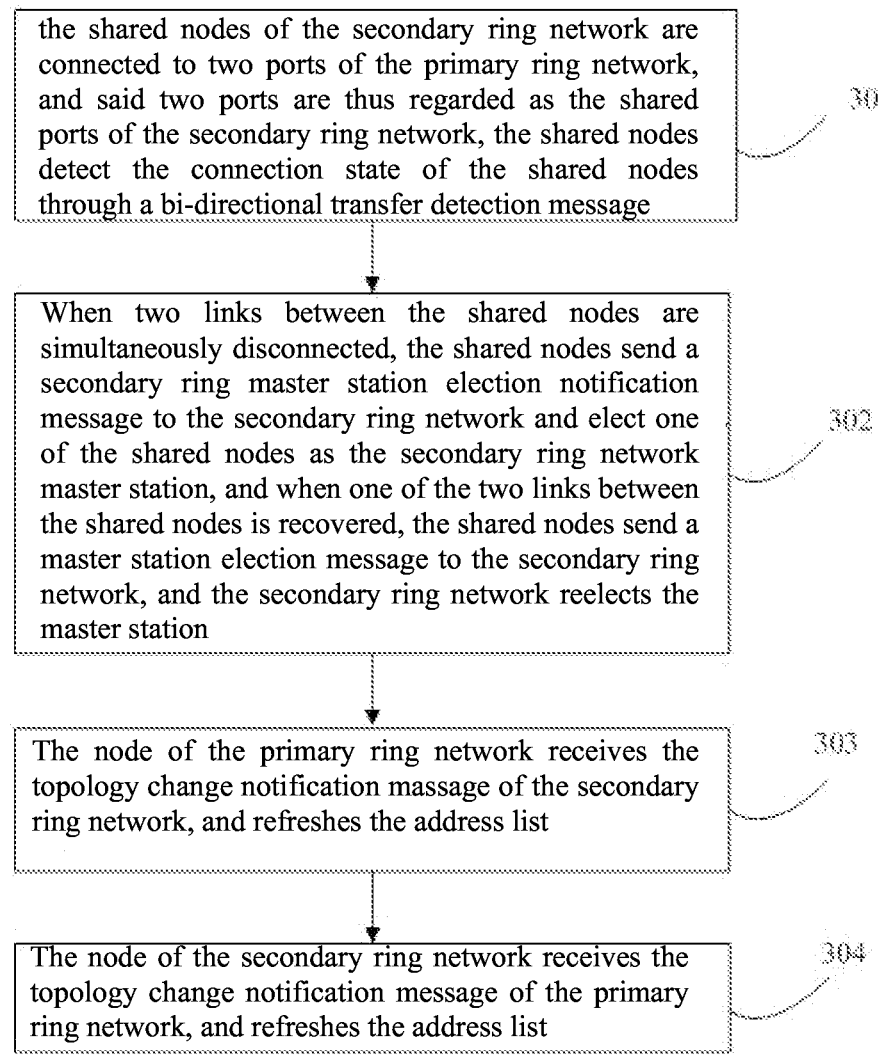
FIG. 3 is a flowchart of implementation of master station redundancy in a secondary ring network in the third embodiment of the present invention.

A double ring network is formed when two single ring networks have two jointly-connected nodes and connecting links. The two jointly-connected nodes are shared nodes, and two links between the shared nodes are shared links One of the single ring networks is a primary ring network. The double ring network is a secondary ring network, and the shared nodes can be elected as the master station and the standby master station of the secondary ring network. The primary ring network and the secondary ring network are divided into different ring network domains according to different IDs by a user. The primary ring network can implement an election of the master station and the standby master station according to the steps of the single ring network. The primary ring network manages the state of the ring ports of the primary ring network, and it is capable of transferring the protocol message of the secondary ring network. The shared nodes can participate in the election of the master station or the standby master station of the secondary ring network while other nodes of the primary ring network cannot. FIG. 3 shows a flowchart of realization of master station redundancy in the secondary ring network in the third embodiment of the present invention. The flow includes the following steps:

Step 301, connecting the shared nodes of the secondary ring network with two ring ports of the primary ring network, said two ring ports of the primary ring network thus being regarded as shared ports of the secondary ring network. The shared nodes detect the connection state between each shared nodes through a bidirectional forwarding detection message (BFD).

Step 302, when the two links between the shared nodes are both simultaneously disconnected, the shared nodes send a secondary ring master station election notification message to the secondary ring network, and elect one of the shared nodes as the secondary ring network master station. Furthermore, when one of the two links between the shared nodes is recovered, the shared nodes send the master station election message to the secondary ring network, and reelect the master station by the secondary ring network.

Step 303, the nodes of the primary ring network receive the topology change notification message of the secondary ring network and refresh the address list.

Step 304, nodes of the secondary ring network receive the topology change notification message of the primary ring network, and refresh the address list.

Figure 4:
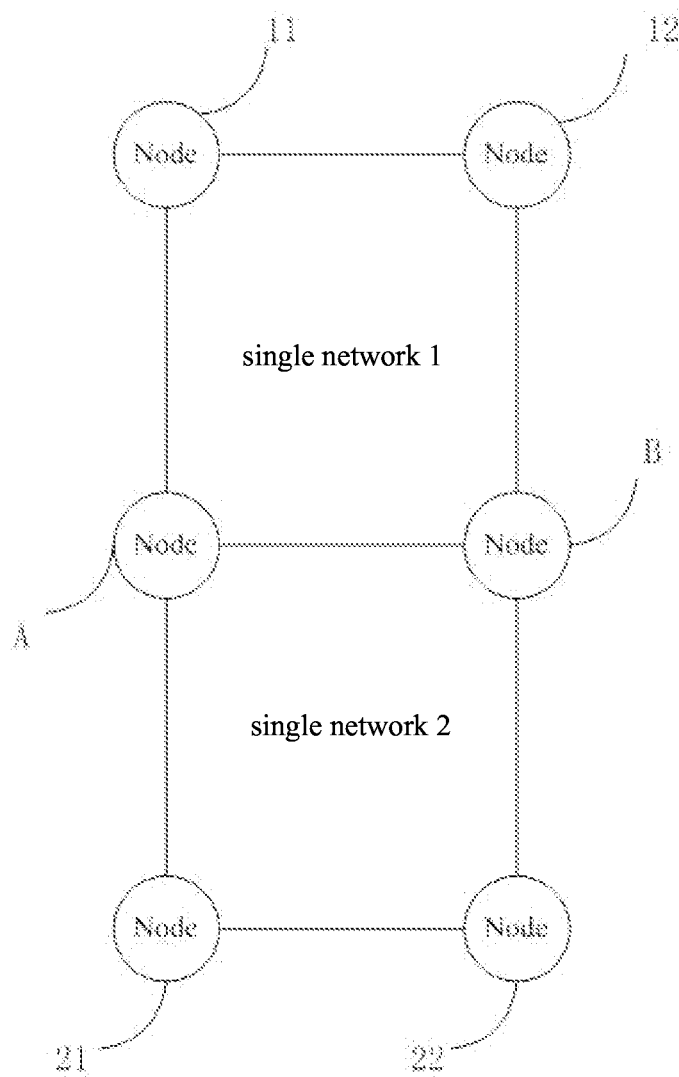
FIG. 4 is a structure diagram of a double ring network in the fourth embodiment of the present invention.

FIG. 4 is a structure diagram of a double ring network in the fourth embodiment of the present invention. As shown in FIG. 4, a double ring network is established when a single ring network 1 and a single ring network 2 have jointly-connected node A and node B and connecting links. The node A and the node B are shared nodes. Two links between the node A and the node B composed of a primary ring network are shared links of the secondary ring network The links between the node A, the node B, a node 11 and a node 12 in the primary ring network or links between the node A and the node B are regarded as the shared links of the secondary ring network. The primary ring network includes the node 11, the node 12, the node A and the node B, and the nodes are mutually connected through links. Moreover, the secondary ring network includes a node 21, a node 22, the node 11, the node 12, the node A and the node B, and the nodes are mutually connected through links. The shared nodes can be elected as the master station and the standby master station of the secondary ring network. The primary ring network and the secondary ring network are divided into different ring network domains according to different IDs by a user. The primary ring network elects the master station and the standby master station according to the steps of the single ring network.

Only the primary ring network manages the state of the ring ports of the primary ring network and it transfers the protocol message of the secondary ring network. the nodes except the node A and the node B of the primary ring network do not participate in the election of the master station or the standby master station of the secondary ring network;

For example, when the node 21 is the master station of the secondary ring network, the ring port of the node 21 connected with the node A is in the half-blocked state and the ring port of the node 21 connected with the node 22 is in the forwarding state. Wen two links between the node A and the node B are simultaneously disconnected, the node A and the node B send the secondary ring master station election notification message to the secondary ring network.

The node A or the node B is as one of the shared nodes which is elected as the master station of the secondary ring network. the ring port of the node 21 connected with the shared node A is switched from the half-blocked state to the forwarding state Then, the node 21 receives the master station election notification message sent from the node A or the node B, which is one of the shared nodes, serving as the master station of the secondary ring network. Furthermore, the node 21 compares the owned node quality comparison vector of with the node quality comparison vector in the master station election notification message to elect the master station of the secondary ring network. A specific election manner is based on the master station election method of the single ring network.

When a direct link between the node A and the node B as one of the two links between the node A and the node B is recovered from disconnection, the node A and the node B send the master station election notification message to the secondary ring network, and the secondary ring network reelects the master station.

The node 11 and the node 12 of the primary ring network receive the topology change notification message of the secondary ring network and refresh the address list.

The node 21, the node 22, the node A and the node B of the secondary ring network receive the topology change notification message of the primary ring network and refresh the address list. When the redundant network at least further includes one external network, wherein the port of an external connecting link of the ring network and the external network are connected through at least two links and the port of the node of the ring network connected with the link is a standby link port, then link redundancy between the ring networks needs to be realized.

Figure 5:
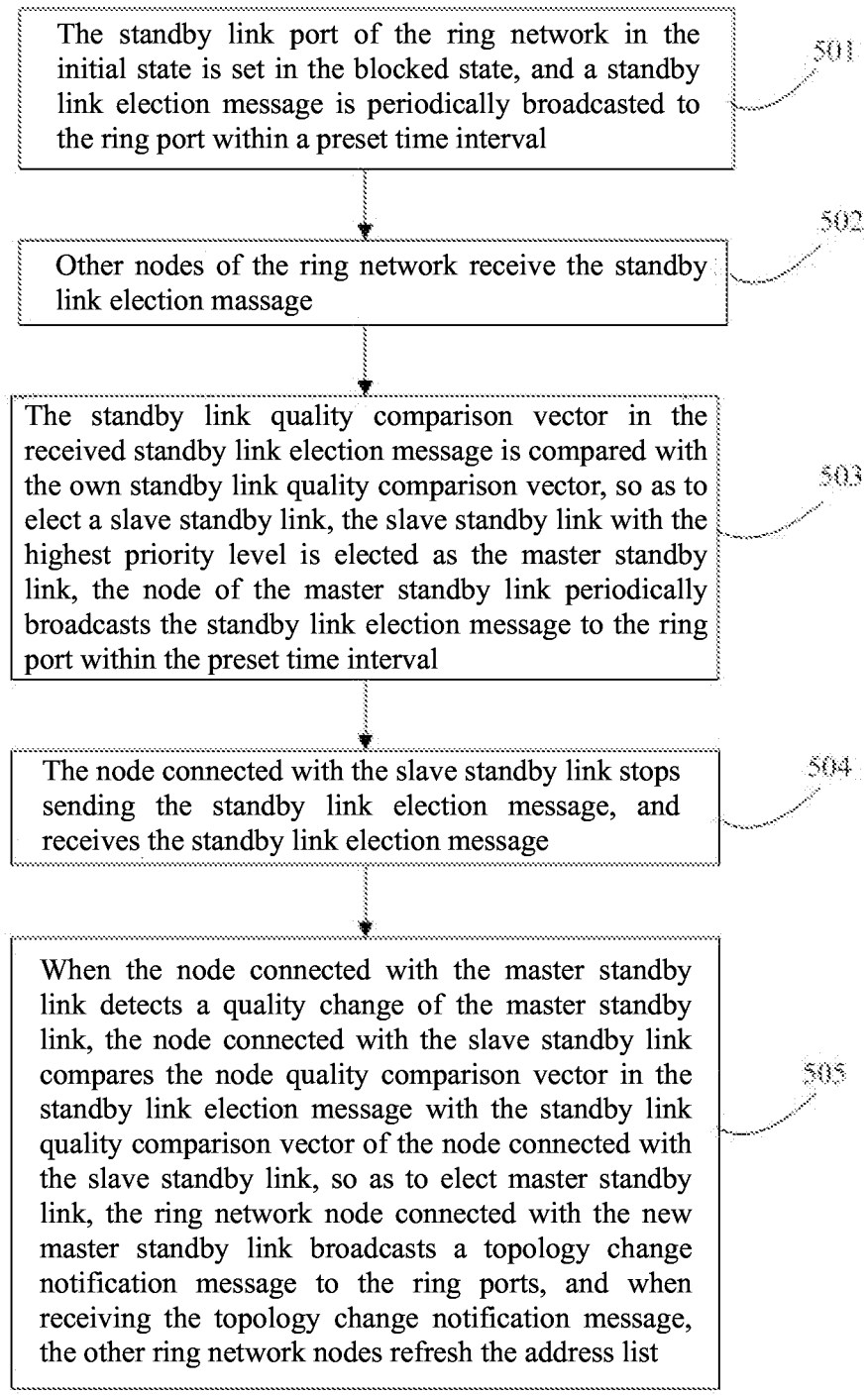
FIG. 5 is a flowchart of implementation of link redundancy between ring networks in the fifth embodiment of the present invention.

FIG. 5 is a flowchart of realization of link redundancy between ring networks in the fourth embodiment of the present invention. As shown in FIG. 5, the flow of realization of link redundancy between the ring networks includes the following steps:

Step 501, the standby link port of the ring network is assigned to the initial state which is as a blocked state. Then, the external connecting node of the ring network periodically broadcasting, a standby link election message to the ring port within a preset time interval, for example, the preset time is 3 s and the period time is 1 s.

Step 502, the other nodes of the ring network receive the standby link election message The standby link election message contains a comparison vector for comparison of the standby link qualities.

The standby link quality comparison vector further includes a standby link state identification, a standby link CRC threshold-crossing level, an IP address and a Mac address. The standby link state identification is used for identifying the state of the link port as connection or disconnection; the standby link CRC threshold-crossing level is used for judging the CRC statistical preset-threshold-crossing levels of the standby link ports within a fixed time interval; and the IP address and the Mac address are used for determining the master standby link and the slave standby link according to the IP address with the Mac address when the master standby link and the slave standby link may not be elected according to the standby link quality.

Step 503, the other nodes of the ring network compare the link quality comparison vector in the received standby link election message with own link quality comparison vector of the external connecting node. a slave standby link can be elected, and the slave standby link is with highest priority level as the master standby link. The own link quality comparison vector of the external connecting node also includes a standby link state identification A standby link CRC threshold-crossing level, an IP address and an Mac address.

After the master standby link and the slave standby link are elected, the standby link port connected with the master standby link is assigned to the forwarding state. Also, the standby link port connected with the slave standby link is assigned to the blocked state, and the node connected with the master standby link periodically broadcasts the standby link election message to the ring ports within the preset time interval, for example, the preset time is 5 s and the period time is 1 s.

The specific election process of the master standby link and the slave standby link is as follows:

(1) when a ring network node without standby link receives the standby link election message, the standby link election message is dropped.

(2) when the standby link state identification of the node receiving the standby link election message is connection, the external link of the node receiving the standby link election message is elected as the standby link; and when the standby link state of the node receiving the standby link election message is switched from disconnection to connection. The standby link of the node receiving the standby link election message assigned as the slave standby link, and the master standby link election message is periodically broadcasted sent to the ring port within the preset time interval.

(3) when the standby link state identification of the standby link election message and the standby link state of the node receiving the standby link election message are both connected, the standby link CRC threshold-crossing level in the standby link quality comparison vector in the standby link election message is compared with the standby link CRC threshold-crossing level of the node receiving the standby link election message, and when the standby link CRC threshold-crossing level in the standby link quality comparison vector in the standby link election message is greater than the standby link CRC threshold-crossing level of the node receiving the standby link election message. The standby link connected with the node is elected as the master standby link, and the master standby link election message is periodically broadcasted sent to the ring port within the preset time interval; and, (4) when the standby link state identification of the standby link election message and the standby link state of the node receiving the standby link election message are both connected, and when the standby link CRC threshold-crossing level of the node receiving the standby link election message is equal to the standby link CRC threshold-crossing level in the standby link election message, the IP address and the Mac address of the node receiving the standby link election message are compared with the IP address and the Mac address of the standby link election message. When the IP address and the Mac address of the standby link election message are longer than the IP address and the Mac address of the node receiving the standby link election message, the standby link of the node receiving the standby link election message is elected as the slave standby link, otherwise, the standby link of the node receiving the standby link election message is elected as the master standby link.

Step 504, the node connected with the slave standby link interrupt to send the standby link election message, and receive the standby link election message.

Step 505, when the node connected with the master standby link detects the quality change of the master standby link, comparing, the node connected with the slave standby link comprises the link quality comparison vector in the standby link election message with the standby link quality comparison vector of the node connected with the slave standby link to elect the master standby link. Then, the standby link port connected with the new master standby link assigned to the forwarding state, and the standby link port of the former master standby link assigned to be as the blocked state. Also, the ring network node connected with the new master standby link broadcasts the topology change notification message to the ring ports. When other ring network nodes receive the topology change notification message, the other ring network nodes refresh the address list.

It should be noted that above description only describes the preferred embodiments of the present invention only, and is not intended to limit the present invention. While the present invention has been described in details with reference to the foregoing embodiments, it is still possible for those skilled in this art to modify the technical solution recorded in the foregoing embodiments or equivalently substitute partial technical features. Any modifications, equivalent substitutions and improvements made without departing from the spirit and principle of the present invention shall fall within the protection scope of the present invention.

The invention claimed is:

1. A method for implementing a redundant network, the redundant network including at least one ring network which comprises at least two nodes, the nodes being connected with ring ports therebetween through a link, wherein the method comprises the following steps in a single ring network:
   A. setting all nodes in the single ring network in an initial state as master stations, setting a ring port of each node in a half-blocked state, and broadcasting, with all nodes, a master station election notification message to the ring ports within a preset time interval;
   B. the master station election notification message comprising a node quality comparison vector;
   C. receiving, with the other nodes in the single ring network, the master station election notification message, and each of the other nodes comparing the node quality comparison vector included in the received master station election notification message with the node quality comparison vector owned in each of the other nodes, so as to elect a standby master station, wherein one of the ring ports of the master station is set in the half-blocked state, the other ring ports of the master station are set in a forwarding state, and wherein the master station periodically broadcasts the master station election notification message to the ring ports within the preset time interval;
   D. stopping the standby master station from sending the master station election notification message; setting the ring ports of the standby master station in the forwarding state; and receiving the master station election notification message sent from the master station;
   E. when the standby master station detects the change of the node quality, the standby master station compares the node quality comparison vector in the received master station election notification message with the node quality comparison vector of the standby master station, so as to re-elect a master station, wherein one of the ring ports of the new master station is set in the half-blocked state, the other ring ports of the new master station are set in the forwarding state, and the ring ports set in the half-blocked state in the former master station are set in the forwarding state; and
   F. when the state of the ring port of the node in the single ring network changes, the node refreshes an address list and broadcasts a topology change notification message to the ring port, and when the other nodes in the single ring network receive the topology change notification message, the other nodes refreshes the address list; wherein,
   in the half-blocked state, the MAC address of a data message source is not adopted through the nodes, and the data message is blocked simultaneously, the protocol message is forwarded in the loop, and a master station election notification message is broadcasted sent to the ring ports within a preset time interval.

2. The method of claim 1, wherein a double ring network is formed when the two single ring networks have two jointly-connected nodes and connecting links, wherein the two jointly-connected nodes are shared nodes, one of the single ring networks is a primary ring network, the double ring network is a secondary ring network, wherein the shared nodes can be elected as the master station and the standby master station of the secondary ring network, and the primary ring network and the secondary ring network are divided into different ring network domains according to different IDs assigned by a user; the primary ring network elects the master station and the standby master station according to the steps of the single ring network, the primary ring network manages the state of the ring ports of the primary ring network and is used to transfer the protocol message of the secondary ring network, except the shared nodes, the other nodes of the primary ring network do not participate in the election of the master station or the standby master station of the secondary ring network, the steps of adopting the secondary ring network comprising:
   G. connecting the shared nodes of the secondary ring network with two ring ports of the primary ring network, said two ring ports of the primary ring network thus being regarded as shared ports of the secondary ring network; and detecting, by the shared nodes, the connection state of the shared nodes through a bidirectional forwarding detection message;
   H. when two links between the shared nodes are simultaneously disconnected, the shared nodes sends a secondary ring master station election notification message to the secondary ring network, and one of the shared nodes is elected as the secondary ring network master station; and when one of the two links between the shared nodes is recovered, the shared nodes send a master station election message to the secondary ring network, and the secondary ring network reelecting the master station;
   I. receiving, with the nodes of the primary ring network, the topology change notification message of the secondary ring network, and refreshing the address list; and
   J. receiving, with the nodes of the secondary ring network, the topology change notification message of the primary ring network, and refreshing the address list.

3. The method of claim 2, wherein the node quality comparison vector comprises a link state identification, a CRC threshold-crossing level, an IP address and an Mac address, wherein the link state identification is defined as the connection state between neighboring nodes, indicating connection or disconnection, and has the priority for determining whether electing the node as the master station; the CRC threshold-crossing level is provided to determine the CRC statistical threshold-crossing levels of the ring ports within a fixed time interval; and the IP address and the Mac address are provided to determine the master station and the standby master station when the master station and the standby master station cannot be elected according to the link state identification and the CRC threshold-crossing level.

4. The method of claim 2, wherein:
(1) when the link state identification of the master station election notification message is disconnection and the link state of the ring port of the node receiving the master station election notification message is connection, the node receiving the master station election notification message is elected as the standby master station;
(2) when the link state of the ring port of the node receiving the master station election notification message is disconnection and the link state in the master station election message received by the node receiving the master station election notification message is connection, the node receiving the master station election notification message is set as the master station, and the master station election notification message is periodically sent according to the preset time interval;
(3) when the link state identification of the master station election notification message and the link state of the ring port in the link state identification of the node receiving the master station election notification message are simultaneously connected or disconnected, the CRC threshold-crossing level in the master station election notification message is compared with the CRC threshold-crossing level of the ring port of the node receiving the master station election notification message, and the node receiving the master station election notification message is elected as the standby master station when the CRC threshold-crossing level in the master station election notification message is greater than the CRC threshold-crossing level of the ring port of the local node;
(4) when the link state identification of the master station election notification message and the link state of the ring port in the link state identification of the node receiving the master station election notification message are simultaneously connected or disconnected, the CRC threshold-crossing level in the master station election notification message is compared with the CRC threshold-crossing level of the ring port of the local node, and when the CRC threshold-crossing level in the master station election notification message is lower than the CRC threshold-crossing level of the ring port of the node receiving the master station election notification message, the node receiving the master station election notification message is set as the master station, and the master station election message is periodically sent according to the preset time interval; and
(5) when the link state identification of the master station election notification message and the link state of the ring port in the link state identification of the node receiving the master station election notification message are simultaneously connected or disconnected, and when the value of the CRC threshold-crossing level in the master station election notification message is equal to the value of the CRC threshold-crossing level of the ring port of the node receiving the master station election notification message, the IP address and the Mac address in the master station election notification message are compared with the IP address and the Mac address of the node receiving the master station election notification message, the node receiving the master station election notification message is elected as the standby master station when the IP address and the Mac address in the master station election notification message are longer than the IP address and the Mac address of the node receiving the master station election notification message, otherwise, the node receiving the master station election notification message is set as the master station, and the master station election message is periodically sent according to the preset time interval.

5. The method of claim 1, wherein the node sends a link detection message to a neighboring node for detecting the link connection and disconnection of the two nodes.

6. The method of claim 1, wherein the redundant network further comprises one external network, wherein the ring network and the external network are connected through at least two links, the port for connection of the links and the nodes of the ring network is a standby link port, and the method further comprises the following steps:
K. when the initial state of the standby link port is the blocked state, the nodes periodically broadcasts a standby link election message to the ring ports of the ring network within a preset time interval;
L. receiving, with the other nodes, the standby link election message sent by the node, wherein the standby link election message contains a standby link quality comparison vector designed for comparing the standby link qualities;
M. the other nodes comparing the link quality comparison vector included in the standby link election message with the standby link quality comparison vectors owned in each of the other nodes, so as to elect a master standby link and a slave standby link, wherein the standby link port connected with the master standby link is set in the forwarding state, the standby link port connected with the slave standby link is set in the blocked state, and the node connected with the master standby link periodically broadcasts the standby link election message to the ring ports;
N. stopping the ring network node connected with the slave standby link from sending the standby link election message, and receiving the standby link election message; and
O. when the ring network node connected with the master standby link detects the quality change of the master standby link, the ring network node connected with the slave standby link compares the link quality comparison vector in the standby link election message with the standby link quality comparison vector of the ring network node connected with the slave standby link, so as to elect a master standby link; setting the standby link port of the former master standby link in the blocked state, wherein the standby link port connected with the new master standby link is set in the forwarding state, the address list is refreshed by the ring network node connected with the new master standby link, wherein the ring network node connected with the new master standby link broadcasts the topology change notification message to the ring ports, and when other ring network nodes receive the topology change notification message, the address list is refreshed by the other ring network nodes.

7. The method of claim 6, wherein the standby link quality comparison vector comprises a standby link state identification, a standby link CRC threshold-crossing level, an IP address and a Mac address, wherein the standby link CRC threshold-crossing level is provided to determine the CRC statistical threshold-crossing levels of the standby link ports within a fixed time interval; the standby link state identification is provided to identify the state of the standby link port as connection or disconnection; and the IP address and the Mac address are provided to determine the master standby link and the slave standby link by comparing the IP address and the Mac address when the master standby link and the slave standby link cannot be elected according to the standby link state identification and the standby link CRC threshold-crossing level.

8. The method of claim 6, wherein:
(1) when a ring network node without assigning the standby link receives the standby link election message, the standby link election message is dropped;
(2) when the standby link state identification of the node receiving the standby link election message is connection, the external link of the node receiving the standby link election message is elected as the standby link; and when the standby link state of the node receiving the standby link election message is switched from disconnection to connection, the standby link of the node receiving the standby link election message is set as the slave standby link, and the master standby link election message is periodically broadcasted sent to the ring port within the preset time interval;
(3) when the standby link state identification of the standby link election message and the standby link state of the node receiving the standby link election message are both connected, the standby link CRC threshold-crossing level in the standby link quality comparison vector in the standby link election message is compared with the standby link CRC threshold-crossing level of the node receiving the standby link election message, and when the standby link CRC threshold-crossing level in the standby link quality comparison vector in the standby link election message is greater than the standby link CRC threshold-crossing level of the node receiving the standby link election message, the standby link connected with the node is elected as the master standby link, and the master standby link election message is periodically broadcasted sent to the ring port within the preset time interval; and
(4) when the standby link state identification of the standby link election message and the standby link state of the node receiving the standby link election message are both connected, and when the standby link CRC threshold-crossing level of the node receiving the standby link election message is equal to the standby link CRC threshold-crossing level in the standby link election message, the IP address and the Mac address of the node receiving the standby link election message are compared with the IP address and the Mac address of the standby link election message, the standby link of the node receiving the standby link election message is elected as the slave standby link when the IP address and the Mac address of the standby link election message are longer than the IP address and the Mac address of the node receiving the standby link election message, otherwise, the standby link of the node receiving the standby link election message is elected as the master standby link.

9. The method of claim 3, wherein:
(1) when the link state identification of the master station election notification message is disconnection and the link state of the ring port of the node receiving the master station election notification message is connection, the node receiving the master station election notification message is elected as the standby master station;
(2) when the link state of the ring port of the node receiving the master station election notification message is disconnection and the link state in the master station election message received by the node receiving the master station election notification message is connection, the node receiving the master station election notification message is set as the master station, and the master station election notification message is periodically sent according to the preset time interval;
(3) when the link state identification of the master station election notification message and the link state of the ring port in the link state identification of the node receiving the master station election notification message are simultaneously connected or disconnected, the CRC threshold-crossing level in the master station election notification message is compared with the CRC threshold-crossing level of the ring port of the node receiving the master station election notification message, and the node receiving the master station election notification message is elected as the standby master station when the CRC threshold-crossing level in the master station election notification message is greater than the CRC threshold-crossing level of the ring port of the local node;
(4) when the link state identification of the master station election notification message and the link state of the ring port in the link state identification of the node receiving the master station election notification message are simultaneously connected or disconnected, the CRC threshold-crossing level in the master station election notification message is compared with the CRC threshold-crossing level of the ring port of the local node, and when the CRC threshold-crossing level in the master station election notification message is lower than the CRC threshold-crossing level of the ring port of the node receiving the master station election notification message, the node receiving the master station election notification message is set as the master station, and the master station election message is periodically sent according to the preset time interval; and
(5) when the link state identification of the master station election notification message and the link state of the ring port in the link state identification of the node receiving the master station election notification message are simultaneously connected or disconnected, and when the value of the CRC threshold-crossing level in the master station election notification message is equal to the value of the CRC threshold-crossing level of the ring port of the node receiving the master station election notification message, the IP address and the Mac address in the master station election notification message are compared with the IP address and the Mac address of the node receiving the master station election notification message, the node receiving the master station election notification message is elected as the standby master station when the IP address and the Mac address in the master station election notification message are longer than the IP address and the Mac address of the node receiving the master station election notification message, otherwise, the node receiving the master station election notification message is set as the master station, and the master station election message is periodically sent according to the preset time interval.

10. The method of claim 7, wherein:

(1) when a ring network node without assigning the standby link receives the standby link election message, the standby link election message is dropped;

(2) when the standby link state identification of the node receiving the standby link election message is connection, the external link of the node receiving the standby link election message is elected as the standby link; and when the standby link state of the node receiving the standby link election message is switched from disconnection to connection, the standby link of the node receiving the standby link election message is set as the slave standby link, and the master standby link election message is periodically broadcasted sent to the ring port within the preset time interval;

(3) when the standby link state identification of the standby link election message and the standby link state of the node receiving the standby link election message are both connected, the standby link CRC threshold-crossing level in the standby link quality comparison vector in the standby link election message is compared with the standby link CRC threshold-crossing level of the node receiving the standby link election message, and when the standby link CRC threshold-crossing level in the standby link quality comparison vector in the standby link election message is greater than the standby link CRC threshold-crossing level of the node receiving the standby link election message, the standby link connected with the node is elected as the master standby link, and the master standby link election message is periodically broadcasted sent to the ring port within the preset time interval; and (4) when the standby link state identification of the standby link election message and the standby link state of the node receiving the standby link election message are both connected, and when the standby link CRC threshold-crossing level of the node receiving the standby link election message is equal to the standby link CRC threshold-crossing level in the standby link election message, the IP address and the Mac address of the node receiving the standby link election message are compared with the IP address and the Mac address of the standby link election message, the standby link of the node receiving the standby link election message is elected as the slave standby link when the IP address and the Mac address of the standby link election message are longer than the IP address and the Mac address of the node receiving the standby link election message, otherwise, the standby link of the node receiving the standby link election message is elected as the master standby link.

* * * * *